United States Patent [19]

Oosaka et al.

[11] 4,454,519

[45] Jun. 12, 1984

[54] INK JET HEAD WITH SLIT NOZZLES

[75] Inventors: Shigenori Oosaka; Katutosi Tozaki, both of Asaka, Japan

[73] Assignee: Fuji Photo Film Co., Ltd., Saitema, Japan

[21] Appl. No.: 400,107

[22] Filed: Jul. 20, 1982

[30] Foreign Application Priority Data

Jul. 24, 1981 [JP] Japan ............................ 56-116232

[51] Int. Cl.³ ......................... G01D 15/18; B41J 3/04

[52] U.S. Cl. ................................ 346/140 R; 346/75; 101/DIG. 13

[58] Field of Search ............................ 346/75, 140 R

[56] References Cited

U.S. PATENT DOCUMENTS 4,166,277 8/1979 Cielo et al. ..................... 346/140 R
4,263,601 4/1981 Nishimura et al. ............. 346/1.1 X
4,287,522 9/1981 Meyer ................................ 346/75

FOREIGN PATENT DOCUMENTS 5118871 12/1980 Japan ............................ 346/140 R

*Primary Examiner*—E. A. Goldberg
*Assistant Examiner*—Gerald E. Preston
*Attorney, Agent, or Firm*—Eyre, Mann, Lucas & Just

[57] ABSTRACT

An ink jet nozzle head comprising a first nozzle head member having a surface on which hydrophilic sections of a predetermined width and hydrophobic sections of a predetermined width are formed alternately and in parallel with one another, and a second nozzle head member having a surface of the same configuration as the surface of the first nozzle head member, these members being opposed to each other to form a very small space therebetween, whereby a plurality of nozzles are formed along the hydrophilic sections. The hydrophilic sections of the second nozzle head member may be positioned just above those of the first member or offset therefrom. The nozzle openings formed between the two members are formed to have acute angle edges.

6 Claims, 6 Drawing Figures

INK JET HEAD WITH SLIT NOZZLES

BACKGROUND OF THE INVENTION

1. Field of the Invention

This invention relates to a nozzle head for ink jet system, and more particularly to an ink jet nozzle head provided with a plurality of nozzle slit openings.

2. Description of the Prior Art

In conventional printers and information output terminals, various kinds of output information are recorded on the recording paper by causing wire heads, printing types or the like to impinge upon the recording paper through an ink ribbon intervening therebetween. With the conventional systems, however, noise of a considerably high level occurs at the time of recording, affecting the working environment in relatively quiet offices. To solve this problem, use is made of the so-called ink jet system for output apparatuses in which a liquid ink is jetted onto the recording paper to record output information thereon. The ink jet systems are divided into the charging control system, ink-on-demand system, electric field control system and ink mist system. In the charging control system, an ink is dispersed into droplets by a vibrator, electrostatically charged, and then deflected by the application of an electric field to record the output information. In the ink-on-demand system, a pressure is applied to an ink reservoir by a piezoelectric element according to the output information to make the ink jet onto the recording paper. In the electric field control system, a potential is applied between nozzle openings and the recording paper according to the output information, and an ink is withdrawn from the nozzle openings by the electrostatic attraction force to record the information on the recording paper. In the ink mist system, an ink stored in an ink reservoir is converted into mist by a vibrator, the ink mist thus formed is selectively ionized by electric discharge according to the output information, and the ionized ink is directed onto the recording paper by the electrostatic attraction force. The nozzle head in accordance with the present invention is in the category of the electric field control system.

The conventional nozzle head of the electric field control system has a single nozzle opening, and the nozzle head linearly scans the recording paper to record the information thereon. With this conventional method, however, the recording speed is relatively low because the nozzle head is mechanically driven. To solve this problem, it has been proposed to use a nozzle head provided with a plurality of nozzle openings arranged in the direction of the scanning line. In this method, instead of mechanically driving the nozzle head, a potential is selectively applied to respective nozzle openings according to the output information, and the information corresponding to one line is recorded nearly simultaneously.

FIG. 1 is a schematic view showing an ink jet recording apparatus provided with a conventional ink jet nozzle head having a plurality of nozzle openings. In FIG. 1, recording paper 3 is positioned between a nozzle head 2 having many nozzle openings and needle-like electrodes 5 corresponding to the respective nozzle openings. A liquid ink is pressurized by a pressure pump 1 or static pressure of the ink to form hemispheric menisci at the nozzle openings. When a voltage is applied between a voltage applying terminal 4 and the respective needle-like electrodes 5 according to the output information, namely when a voltage is selectively applied to the respective needle-like electrodes 5 according to the output information, the ink minisci formed at the corresponding nozzle openings are selectively caused to jet onto the recording paper 3 to record the information. The recording paper 3 is moved by feed rollers 6, and the output information of the next line is recorded. In this way, the output information is recorded on the whole recording paper 3.

With the nozzle head having many nozzle openings, it is possible to record the information of one line nearly simultaneously without mechanically driving the nozzle head to linearly scan the recording paper. Therefore, the output information can be recorded at a high speed. In the past, the nozzle head having a plurality of nozzle openings was manufactured by forming the nozzle grooves by means of machining. However, when the output information is image information which should be recorded at a high density and a high resolution, it is necessary to form nozzles having very small openings at narrow intervals in order to obtain an image output of high quality. With the machining processes, however, the dimensional accuracy is limited and it is difficult to form nozzles capable of providing a high recording density and a high resolution.

SUMMARY OF THE INVENTION

The primary object of the present invention is to provide an ink jet nozzle head capable of recording information at a high density and a high resolution.

Another object of the present invention is to provide an ink jet nozzle head capable of being manufactured easily at a low cost.

The specific object of the present invention is to provide an ink jet nozzle head provided with very small nozzle openings formed at narrow intervals.

The ink jet nozzle head in accordance with the present invention comprises a first nozzle head member having a surface on which hydrophilic sections of a predetermined width and water repellent sections of a predetermined width are formed alternately and in parallel with one another, and a second nozzle head member having a surface of the same configuration as said surface of said first nozzle head member, the two members being opposed to each other to form a very small space between said surfaces thereof, whereby a plurality of nozzles are formed along said hydrophilic sections. In the present invention, the nozzles can be formed for example by photolithography, instead of machining. Accordingly, it is possible to form nozzles having very small dimensions at a high accuracy. The nozzle head in accordance with the present invention can record information at a high density and a high resolution and can be manufactured easily at a low cost.

The present invention will hereinbelow be described in further detail with reference to the accompanying drawings.

DESCRIPTION OF THE PREFERRED EMBODIMENTS

Figure 1:
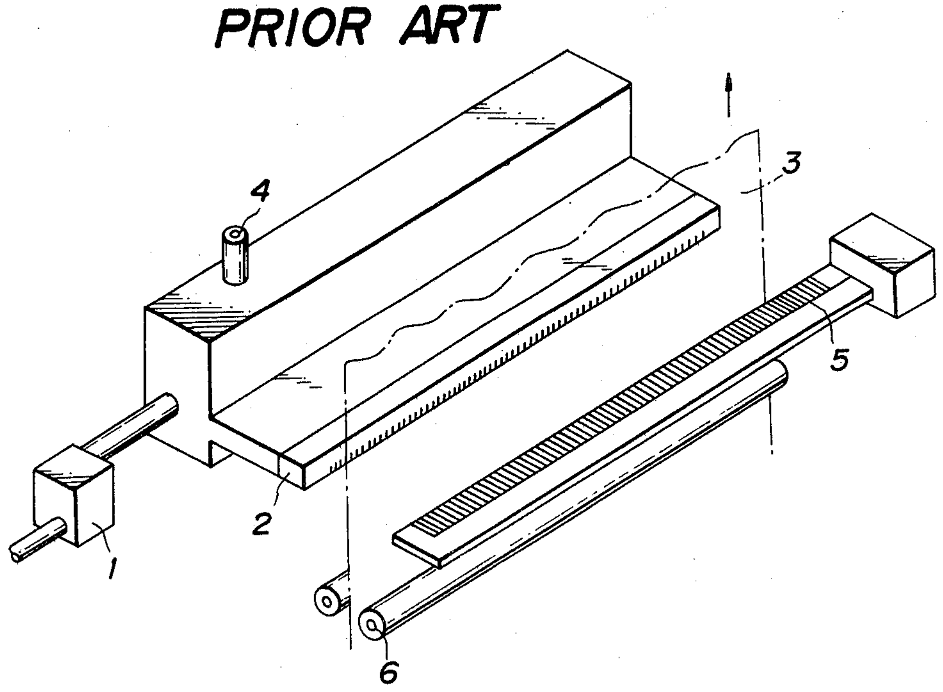
FIG. 1 PRIOR ART
FIG. 1 is a prior art ink jet nozzle head.
Figure 2:
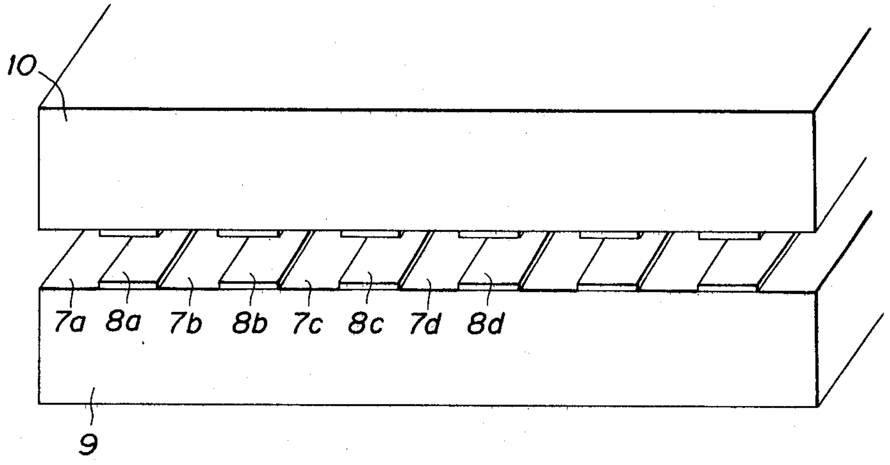
FIG. 2 is a schematic view showing an embodiment of the ink jet nozzle head in accordance with the present invention.

Referring to FIG. 2 showing an embodiment of the ink jet nozzle head in accordance with the present invention, a first nozzle head member 9 has a surface on which hydrophilic sections *7a, 7b, 7c, 7d*, . . . of a predetermined width and hydrophobic sections *8a, 8b, 8c, 8d*, . . . of a predetermined width are alternately formed in parallel with one another. A second nozzle head member 10 has a surface of the same configuration as the surface of the first nozzle head member 9. The members 9 and 10 are opposed to each other to form a space of about several tens of microns between their surfaces. In this embodiment, the hydrophilic sections of the second nozzle head member 10 are positioned just above those formed on the first nozzle head member 9. Accordingly, an ink can penetrate through the space between the hydrophilic sections of the nozzle head members 9 and 10, and the nozzles having the same width as the hydrophilic sections are formed. The width of each hydrophilic section and that of each water repellent section are generally about several tens of microns.

The nozzle head members provided with the hydrophilic and water repellent sections on the surface can be formed for example by the conventional presensitized plate manufacturing process employed in offset printing.

Figure 3A:
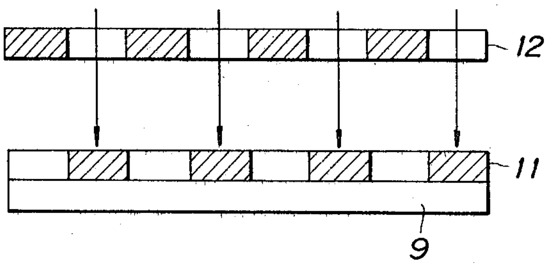
FIGS. 3A and 3B are explanatory views showing the processes for forming the nozzle head.
Figure 3B:
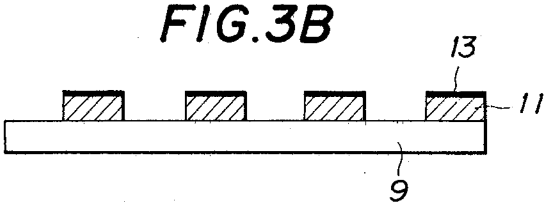

FIGS. 3A and 3B show the processes for forming the nozzle head members in accordance with the present invention by use of the manufacturing processes for negative presensitized plates. In the manufacture of the nozzle head member 9, it is preferable to use an aluminium plate which is light in weight and has a hydrophilic surface. The surface of the aluminium plate is first cleaned, grained by the brush polishing method or the electropolishing method, and then treated with a sodium silicate solution to make the surface hydrophilic. Thereafter, a photo-setting type of light-sensitive resin 11 is applied to the hydrophilic surface of the aluminium plate, and the surface is exposed to light through a photomask 12 as shown in FIG. 3A. As a result, the portions of the light-sensitive resin 11 exposed to light harden and, when developed, they remain on the aluminium plate 9 as shown in FIG. 3B. A lacquer 13 or the like is then applied to the surface of the remaining resin sections to form the water repellent sections. In this way, it is possible to easily form the nozzle head members having the hydrophilic sections and the water repellent sections on the surfaces.

In the above described processes, the light-sensitive resin is of the photo-setting type. However, it is also possible to use a photo-decomposing type of light-sensitive resin.

As described above, the ink jet nozzle head in accordance with the present invention can be manufactured by use of photolithography and, therefore, a nozzle head having very small nozzle openings which cannot be achieved with machining can be formed at a high accuracy. For example, in the manufacture of integrated circuits, it is known that photolithography can provide components with a dimensions on the order of 1 μm at a high accuracy. Further, the nozzle head in accordance with the present invention can be mass-produced at a low cost and a high efficiency.

Figure 4:
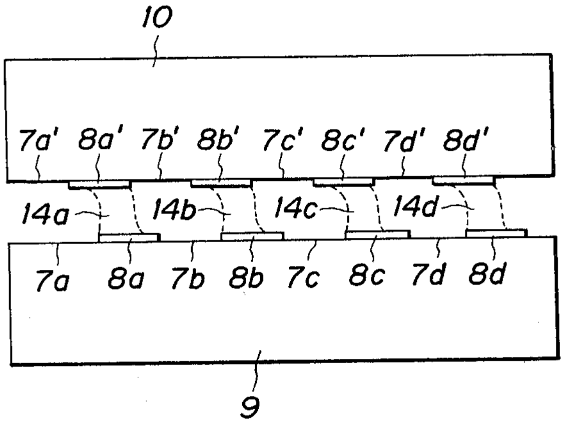
FIG. 4 is a schematic view showing another embodiment of the ink jet nozzle head in accordance with the present invention.

FIG. 4 shows another embodiment of the ink jet nozzle head in accordance with the present invention. In FIG. 4, the hydrophilic sections *8a', 8b', 8c'* and *8d'* of the second nozzle head member 10 are not positioned just above the hydrophilic sections *8a, 8b, 8c* and *8d* of the first nozzle head member 9 but are offset therefrom. Accordingly, as shown by the broken lines in FIG. 4, nozzles 14a, 14b, 14c and 14d each having a width smaller than that of each hydrophilic section are formed. The size of the nozzles can be adjusted to a value smaller than the width of the hydrophilic sections by appropriately changing the position of the second nozzle head member 10 with respect to the first nozzle head member 9. Therefore, it is possible to first form the hydrophilic sections to a relatively large width in order to facilitate their manufacture, and then adjust the size of the nozzles when the first nozzle head member 9 and the second nozzle head member 10 are combined with each other.

Figure 5:
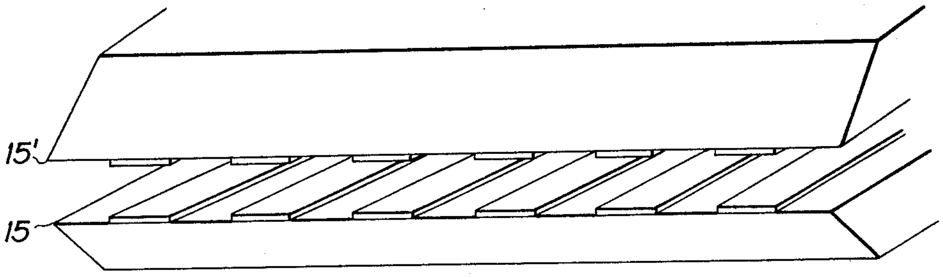
FIG. 5 is a schematic view showing a further embodiment of the ink jet nozzle head in accordance with the present invention.

FIG. 5 shows a further embodiment of the ink jet nozzle head in accordance with the present invention. In this embodiment, edges 15 and 15' of the nozzle openings formed by the first nozzle head member 9 and the second nozzle head member 10 and formed at an acute angle. The acute angle edges 15 and 15' can prevent the ink menisci formed at the nozzle openings from expanding excessively and thus allows high-resolution output recording. Alternatively, a water-repellent material may be applied to the edges of the nozzle head in order to prevent the ink menisci from expanding.

We claim:

1. An ink jet nozzle head comprising a first nozzle head member having a surface on which hydrophilic sections of a predetermined width and water repellent sections of a predetermined width are formed alternately and in parallel with one another, and a second nozzle head member having a surface of the same configuration as said surface of said first nozzle head member, the two members being opposed to each other to form a very small space between said surfaces thereof, whereby a plurality of nozzles are formed along said hydrophilic sections.

2. An ink jet nozzle head as defined in claim 1 wherein said hydrophilic sections of said second nozzle head member are positioned just above said hydrophilic sections of said first nozzle head member.

3. An ink jet nozzle head as defined in claim 1 wherein said hydrophilic sections of said second nozzle head is offset from the position just above said hydrophilic sections of said first nozzle head member.

4. An ink jet nozzle head as defined in claim 1 wherein the nozzle openings formed between said first and second nozzle head members have acute angle edges.

5. An ink jet nozzle head as defined in claim 1 wherein said space formed between said surfaces of said first and second nozzle head members is on the order of about several tens of microns.

6. An ink jet nozzle head as defined in claim 1 wherein said width of the hydrophilic sections and the water repellent sections is on the order of about several tens of microns.

* * * * *